Patented June 15, 1954

2,681,361

UNITED STATES PATENT OFFICE 2,681,361

PRODUCTION OF ALKALI SALTS OF ACI-NITRO COMPOUNDS

Heinrich Hopff and Otto von Schickh, Ludwigshafen (Rhine), Germany, assignors to Badische Anilin- & Soda-Fabrik Aktiengesellschaft, Ludwigshafen (Rhine), Germany No Drawing. Application May 29, 1952, Serial No. 290,839

Claims priority, application Germany June 1, 1951

4 Claims. (Cl. 260—500)

This invention relates to improvements in the production of alkali salts of aci-nitroalkanes and nitrocycloalkanes.

It is already known that nitroalkanes and nitrocycloalkanes form, with alkalies, salts of their aci-form provided there is still at least one hydrogen atom on the carbon atom bearing the nitro group. The speed of formation of the salts is often very small when employing aqueous alkali solutions, however, so that the yield is sometimes bad, partly also by reason of side reactions and decompositions.

We have now found that the formation of the alkali salts proceeds much more rapidly when small amounts of oximes are dissolved in the nitroalkanes and the aqueous alkali solutions are then allowed to act on these solutions. The formation of the salts then takes place momentarily in almost quantitative yields with spontaneous development of heat. Therefore cooling of the reaction mixture is indicated.

As starting materials there may be used nitromethane, -ethane, -cyclopentane, -cyclohexane, -cyclooctane and their homologues, 2- and 1-nitropropane, the isomer nitrobutanes, -pentanes, -decanes and -hexadecanes and omega-nitro toluene. Inert diluents, such as alcohols, ethers, tetrahydrofurane, ketones or pyridine, can be added.

As oximes there may be used, principally any aldehyde or ketone oxime; it is preferable however to use the oxime corresponding to the nitroalkane or nitrocycloalkane employed. About 0.5 to 10% thereof, calculated with reference to the nitro compound, is sufficient. The concentration of the aqueous alkali solution is preferably above 15% and it is advantageous to use highly concentrated, as for example 25 to 50% solutions.

The alkali salts of aci-nitroalkanes and nitrocycloalkanes are valuable intermediate products.

The following examples will further illustrate this invention but the invention is not restricted to these examples. The parts are by weight.

Example 1

10 parts of cyclohexanone oxime are dissolved in 129 parts of nitrocyclohexane and a 30% aqueous solution of 40 parts of caustic soda is added thereto preferably while stirring and cooling to about 15° C. The separation of the sodium salt of aci-nitrocyclohexane commences immediately. The salt can be filtered off by suction and isolated as such, or may be brought into solution by the addition of water.

Example 2

The procedure of Example 1 is followed but with the caustic soda solution replaced by a 50% aqueous solution of 57 parts of caustic potash. The potassium salt of acid-nitrocyclohexane is obtained.

Example 3

10 parts of acetone oxime are dissolved in 150 parts of a mixture of nitroalkanes obtained by the gas-phase nitration of gasoline. A 30% aqueous solution of 40 parts of caustic soda is added thereto while cooling and stirring. By the addition of water a clear solution of the sodium salts of the aci-nitroalkanes is obtained.

What we claim is:

1. An improved process for the production of alkali salts of aci-nitroalkanes and -nitrocycloalkanes which comprises dissolving 0.5 to 10 per cent of a member of the group consisting of cyclohexanone oxime and acetone oxime in a member of the group consisting of nitrocyclohexane and the nitroalkanes obtainable by the gas-phase nitration of gasoline and adding at least stoichiometric amounts of a 15 to 50 percent aqueous solution of caustic alkali while stirring and cooling.

2. An improved process for the production of the sodium salt of aci-nitrocyclohexane which consists in adding a 30 per cent aqueous solution of caustic soda, while stirring and cooling, to a solution of from 0.5 to 10 per cent of cyclohexanone oxime in nitrocyclohexane.

3. An improved process for the production of the potassium salt of aci-nitrocyclohexane which consists in adding a 50 per cent aqueous solution of caustic potash, while stirring and cooling, to a solution of from 0.5 to 10 per cent of cyclohexanone oxime in nitro-cyclohexane.

4. A process for the production of an aqueous solution of sodium salts of aci-nitroalkanes which consists in adding an at least 15 per cent aqueous caustic soda solution to a solution of from 0.5 to 10 per cent of acetone oxime in a mixture of nitroalkanes obtained by the gas-phase nitration of gasoline, and adding water to the reaction mixture.

References Cited in the file of this patent

UNITED STATES PATENTS

| Number | Name | Date |
|---|---|---|
| 2,151,517 | Kamlet | Mar. 21, 1939 |
| 2,168,305 | Lippincott | Aug. 1, 1939 |
| 2,370,185 | Nygaard et al. | Feb. 27, 1945 |